(12) United States Patent
Cooper et al.

(10) Patent No.: US 9,300,144 B2
(45) Date of Patent: Mar. 29, 2016

(54) INTEGRATED DRIVE MOTOR POWER INTERFACE

(71) Applicant: ROCKWELL AUTOMATION TECHNOLOGIES, INC., Mayfield Heights, OH (US)

(72) Inventors: Mark Cooper, Eden Prairie, MN (US); Mark Alan Gries, Wauwatosa, WI (US); Zoran Vrankovic, Greenfield, WI (US); David Dean Van Dorpe, Burnsville, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/523,228

(22) Filed: Oct. 24, 2014

(65) Prior Publication Data
US 2015/0042162 A1 Feb. 12, 2015

Related U.S. Application Data

(63) Continuation of application No. 13/661,566, filed on Oct. 26, 2012, now Pat. No. 8,872,460.

(60) Provisional application No. 61/560,139, filed on Nov. 15, 2011.

(51) Int. Cl.
| | |
|---|---|
| *G05B 19/416* | (2006.01) |
| *H02J 4/00* | (2006.01) |
| *H02H 7/08* | (2006.01) |
| *H02H 7/122* | (2006.01) |
| *H02P 29/02* | (2006.01) |
| *H02P 5/74* | (2006.01) |

(52) U.S. Cl.
CPC .. *H02J 4/00* (2013.01); *H02H 7/08* (2013.01); *H02H 7/1227* (2013.01); *H02P 5/74* (2013.01); *H02P 29/021* (2013.01); *Y10T 307/258* (2015.04)

(58) Field of Classification Search
CPC ........... H02P 5/74; H02P 6/16; H02P 24/021; G05B 15/02
See application file for complete search history.

(56) References Cited

U.S. PATENT DOCUMENTS

2012/0316717 A1* 12/2012 Daum ................. B60L 11/1842
701/22

* cited by examiner

*Primary Examiner* — Karen Masih
(74) *Attorney, Agent, or Firm* — Fletcher Yoder P.C.

(57) ABSTRACT

An integrated drive motor (IDM) power distribution architecture utilizes an IDM power interface module (IPIM) to create a control voltage that is distributed to all the IDMs in a network. This power distribution may be accomplished along a hybrid cable, for example, that includes both signal conductors and power conductors. The IPIM is capable of detecting short circuits and/or overload conditions and disabling the power supply to the IDMs. Additionally, a second power supply may be utilized in the IPIM such that when the power supply to the IDMs is deactivated, the IPIM may remain functional, for example, to report one or more fault conditions to the user. Additionally, this reporting of fault status may be accomplished via a user display integrated with or coupled to the IPIM.

20 Claims, 5 Drawing Sheets

INTEGRATED DRIVE MOTOR POWER INTERFACE

CROSS-REFERENCE TO RELATED APPLICATIONS

This application is a Continuation patent application of U.S. patent application Ser. No. 13/661,566, entitled "Integrated Drive Motor Power Interface", filed Oct. 26, 2012, of which claims the benefit of U.S. Provisional Application No. 61/560,139, filed Nov. 15, 2011, and which are herein incorporated by reference.

BACKGROUND

The invention relates generally to the field of fault prevention and failure monitoring for drive motors.

Integrated drive motors (IDMs) may be found in many modern manufacturing plants. IDMs may include a circuit for driving an electromagnetic machine, such as a brushed or brushless motor, stepper motor, or other electromechanical actuator, which may be internal to or external from the IDM. In this manner, the IDM may provide control signals for controlling a motor. The IDM may also include components for transforming a voltage and transmitting that voltage to the motor.

In some embodiments, multiple IDMs may be positioned across various parts of a factory or manufacturing site. Additionally, one or more IDM power interface modules (IPIMs) may be utilized to provide power and control signals to the IDMs. However, when a short circuit or overcurrent condition occurs on the line between the IDMs and an IPIM, the IPIM may be affected such that the IPIM may not operate or may be damaged. When the IPIM is affected by a short circuit or overcurrent condition, a user may not be able to determine the cause of fault. Accordingly, it is now recognized that it is desirable to have a system that would provide fault diagnostics even when a short circuit or overdrive condition from one or more of the IDMs affects the operation of the IPIM, protects the IPIM from damage from, for example, potential customer miswiring of the IDMs or IPIM or from having the system configured to power too may IDMs.

BRIEF DESCRIPTION

Present embodiments include an integrated drive motor (IDM) power distribution architecture that utilizes an IDM power interface module (IPIM) to create a 42V control voltage that is distributed to all the IDMs in a network. This power distribution may be accomplished along a hybrid cable, for example, that includes both signal conductors and power conductors. In one embodiment, the IPIM is configured to detect short circuit and/or overload conditions and disable the power supply to the IDMs. Additionally, a second power supply may be utilized in the IPIM such that when the power supply to the IDMs is deactivated, the IPIM may remain functional, for example, to report one or more fault conditions to the user. Additionally, this reporting of fault status may be accomplished via a user display integrated with or coupled to the IPIM (e.g., in a single cabinet). Specifically, in one embodiment, the display on the IPIM is located in the customer cabinet. This is to help with debugging, particularly on larger machines. Additionally, a network connection may be utilized to transmit a fault condition to a secondary location based on various device and network faults. Further, present embodiments may include an interactive display in the IPIM.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
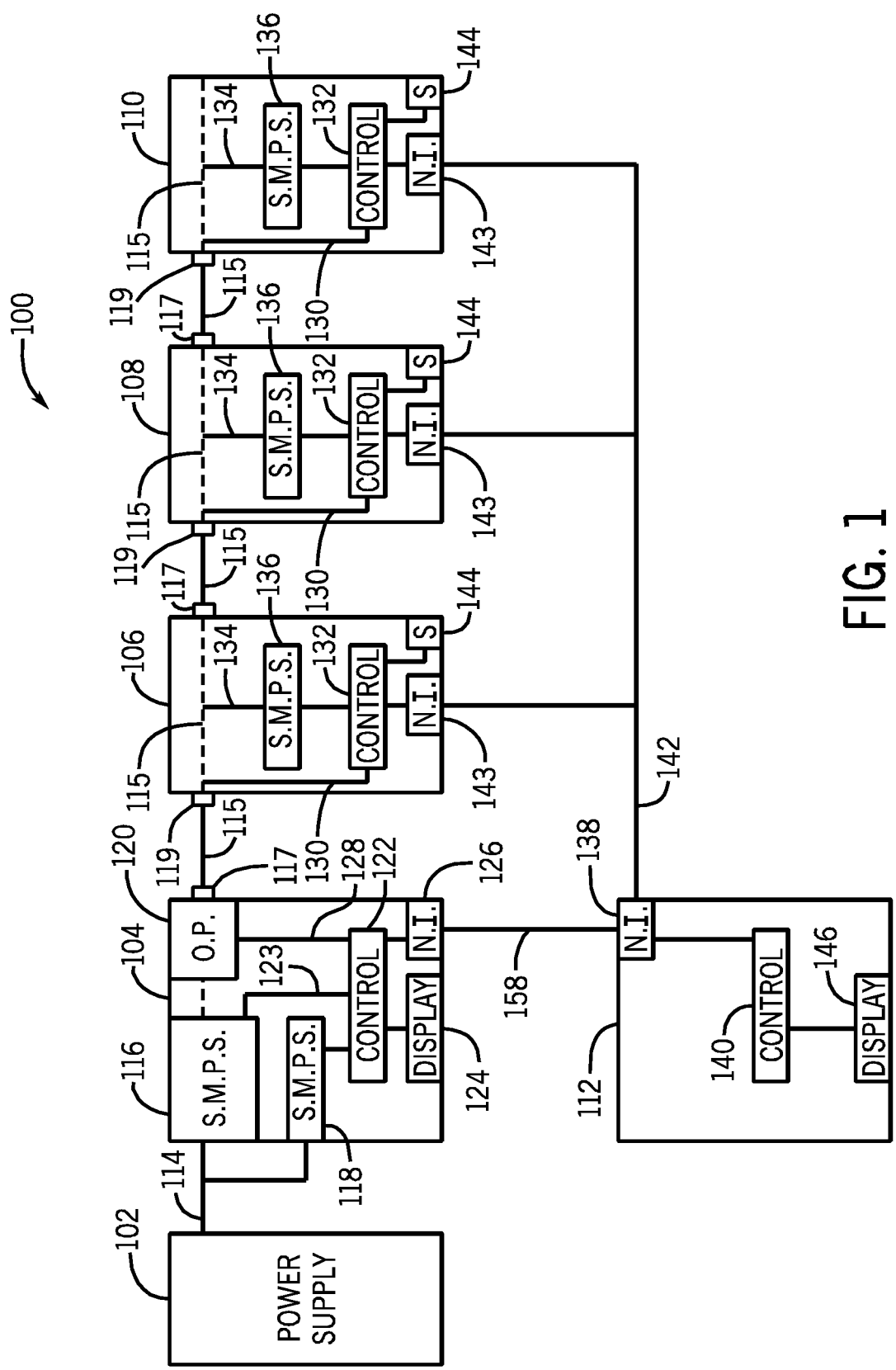
FIG. 1 illustrates a block diagram of an industrial automation network in accordance with an embodiment.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein to simplify explanation, the disclosure is intended to cover all combinations of these embodiments.

FIG. 1 illustrates an industrial automation network 100. This industrial automation network 100 may include a power supply 102, an integrated drive motor (IDM) power interface module (IPIM) 104, multiple IDMs 106, 108, and 110, and a network controller 112. Although a single power supply 102, IPIM 104, and network controller 112 as well as three IDMs 106, 108, and 110 are illustrated, more or less of each component may be utilized in accordance with present techniques and the illustrated embodiment is presented as an example only. For example, in one embodiment, two IPIMs 104 may be utilized in conjunction with a single power supply 102, whereby each IPIM 104 is coupled to a set of three (or more, e.g., five) IDMs 106, 108, and 110. Another embodiment might include, for example, three IPIMs 104 each utilized in conjunction with a single power supply 102, whereby each IPIM 104 is coupled to a single IDM 106. Indeed, multiple such configurations are within the scope of the present disclosure.

In one embodiment, the power supply 102 operates to generate and/or transmit a voltage to the IPIM 104 along a voltage line 114. This may be an AC voltage at, for example, approximately 230 volts. As illustrated, this voltage line 114 may pass the voltage from the power supply 102 to the IPIM 104, where it may be rectified to a DC voltage and stepped down to a secondary voltage for transmission along a hybrid cable 115 (coupled to a network interface 117), whereby the hybrid cable 115 carries both control and/or communication signals and the voltage from the IPIM 104 to each of the IDMs 106, 108, and 110. In one embodiment, the voltage carried on hybrid cable 115 may be 42 volts; however, other voltages are contemplated as being carried on hybrid cable 115.

As illustrated, the IPIM 104 is configured to receive an AC voltage along voltage line 114 from the power supply 102. This voltage may be sent to a switch mode power supply 116 (e.g., which may transmit power to external devices) and an internal switch mode power supply 118 (e.g., which may transmit power to internal components of the IPIM 104). In one embodiment, the voltage from voltage line 114 may be rectified by a single rectifier prior to transmission to the switch mode power supply 116 and the internal switch mode power supply 118. Alternatively, each of the switch mode power supply 116 and the internal switch mode power supply 118 may include a rectifier for generating direct current voltage from the AC voltage received along voltage line 114.

The use of multiple power supplies (e.g., switch mode power supply 116 and an internal switch mode power supply 118) may be beneficial if, for example, a short occurs on any of the power outputs (e.g., hybrid cable 115) on startup, since this condition may prevent the switch mode power supply 116 from starting. Likewise, in the situation of when a short may occur after startup, the switch mode power supply 116 may enter a "hiccup" mode, where the switch mode power supply 116 restarts and stops continuously. By utilizing a second power supply, e.g., internal switch mode power supply 118, power may still be delivered to the components of the IPIM 104 if the switch mode power supply 116 is shorted at power up or during normal operation so that a short or overload condition on the switch mode power supply 116 will have no effect on the ability of the internal switch mode power supply 118 to deliver power. That is, bifurcation of power delivery may be accomplished such that the internal switch mode power supply 118 may, for example, supply control power for the IPIM 104 while the switch mode power supply 116 may, for example, transmit power for the IDMs 106, 108, and 110.

As noted above, the switch mode power supply 116 may operate to provide an output voltage differing from the voltage received on voltage line 114 to, for example, IDMs 106, 108, and 110. Thus, the switch mode power supply 116 may generate 42 volt power to be transmitted from the IPIM 104 along hybrid cable 115 via network interface 117 to network interfaces 119 of the IDMs 106, 108, and 110. This transmission of power and network signals may be conducted on distinct conductors (e.g., wired) in the hybrid cable 115 or, in some embodiments, the power and network signals may be transmitted on a single (e.g., combined) conductor. Internal switch mode power supply 118 may receive power from voltage line 114 and may operate to output one or more differing voltages therefrom. For example, the internal switch mode power supply 118 may convert rectified voltage from the voltage line 114 to 12 volt power, 5 volt power, 3.3 volt power, or other values and may transmit one or more of these voltages to a control 122. In this manner, the internal switch mode power supply 118 may power, for example, the control and switches of the switch mode power supply 116, thereby allowing a switch mode power supply 116 auxiliary voltage to be present and active, even under a short condition.

The controller 122 may include one or more circuit boards that may include one or more microprocessors, such as one or more "general-purpose" microprocessors, one or more special-purpose microprocessors and/or one or more field-programmable gate arrays (FPGAs), application specific integrated circuits (ASICs), or some combination thereof. Furthermore, the controller 122 may execute one or more algorithms, code, or computer programs, which may be stored on a tangible non-transitory machine readable medium, such as volatile memory (e.g., random access memory), and/or non-volatile memory (e.g. read-only memory). It should be noted that the term non-transitory merely indicates that the medium is not a signal. This memory may be internal to or directly coupled to the controller 122. In some embodiments, the controller 122 may interact with a display 124 and a network interface 126 of the IPIM 104, as well as transmit control and/or communication signals to the IDMs 106, 108, and 110.

Display 124 may be configured to display information relating to the operation of the IPIM 104, the operation of one or more of the IDMs 106, 108, and/or 110, setup information for the IPIM 104 and/or the IDMs 106, 108, and/or 110 or failures of the IPIM 104 and/or the IDMs 106, 108, and/or 110, among other information useful to a user. The display 124 may include a liquid crystal display, an organic light emitting diode display, or any other conventional display type and/or may utilize light emitting diodes to represent information relating to the IPIM 104 and/or the IDMs 106, 108, and/or 110. In the illustrated embodiment, the display 124 is integral with the IPIM 104, however, it should be understood that the display 124 may be additionally and/or alternatively remotely located from the IPIM 104 and connected to the IPIM 104 via a display interface including a wireless transmitter (e.g., zigbee, Bluetooth, etc.). In this manner, the IPIM 104 may transmit signals for display to a wirelessly connected display 124 (e.g., which may be a standalone device or may be integrated into an electronic device containing a display screen such as a smart phone, touchpad, laptop, or other electronic device.

As noted above, the IPIM 104 also includes a network interface 126 that may be utilized to provide communication between the IPIM 104 and various devices. The network interface 126 may provide communication via a personal area network (PAN) (e.g., Bluetooth), a local area network (LAN) (e.g., Wi-Fi), a wide area network (WAN) (e.g., 3G or LTE), a near field communication device (NFC), a physical connection (e.g., an Ethernet connection), and/or the like and, as such, may include known hardware and software necessary to complete such communications. In some embodiments, network interface 126 may include network interface 117.

As noted above, the controller 122, the display 124, and the network interface 126 may be powered by the internal switch mode power supply 118. Thus, even if a short or startup problem occurs, for example, at the switch mode power supply 116 or at network interface 117, the controller 122 may still be powered to diagnose the problem being encountered as well as alert a user of a problem via the display 124 and/or the network interface 126. This may allow for detection and mitigation of overload conditions that might not be possible if only a single power supply were utilized in the IPIM 104.

As illustrated, the controller 122 may transmit control and/or communication signals along line 128 to be combined with voltage from the switch mode power supply 116 into hybrid cable 115. Thus, hybrid cable 115 may transmit both voltage and the control and/or communication signals carried on line 128, for example, from network interface 117. Hybrid cable 115 may be coupled to IDMs 106, 108 and 110 via network interfaces 119. For example, lines 130 may receive control and/or communication signals from hybrid cable 115 and transmit the control and/or communication signals to controllers 132 (which may include elements similar to controller 122) in each of the IDMs 106, 108, and 110. Additionally, power lines 134 may be coupled to an internal switch mode power supply 136 in each of the IDMs 106, 108, and 110. The internal switch mode power supply 136 in each of the IDMs 106, 108, and 110 may convert, for example, received 42 volt power to 12 volt power, 5 volt power, 3.3 volt power, or other values and may transmit one or more of these voltages to, for example, the controller 132 coupled thereto. In another embodiment, lines 130 may transmit only power and communication signals (e.g., no control signals) received from hybrid cable 115. Again, these signals may be transmitted on distinct conductors in the hybrid cable 115 or may be transmitted on a shared conductor in the hybrid cable 115.

On occasion, one or more of the IDMs 106, 108, and 110 may experience a fault, which may potentially cause a short (for example, generated based on incorrect customer wiring of one or more components) or an overcurrent condition (e.g., an overload current condition) that may potentially damage the IPIM 104. To prevent this short or overload condition from potentially damaging the IPIM 104, an overload protection circuit 120 may be utilized in the IPIM 104. The overload protection circuit 120 may include a current sensor for detecting a short circuit or overcurrent during operation. For example, if the sensor detects current over the rated current for an extended period of time, a protection control circuit may generate a signal causing a pulse width modulator in the switch mode power supply 116 to turn-off, thus ceasing a power connection across hybrid cable 115. Additionally, the overload protection circuit 120 may transmit a signal, for example, from the protection control circuit to the controller 122 of the IPIM 104 to annunciate the fault condition. The controller 122 may then generate and transmit signals for display on the display 124 annunciating the fault condition and/or providing troubleshooting steps.

Additionally, when a short circuit fault condition occurs, the control logic of the controller 122 or the overload protection circuit 120 may, for example, permanently disable the switch mode power supply 116 until, for example, a fault reset occurs. For example, the controller 122 may receive a signal from the overload protection circuit 120 annunciating the fault condition and may generate a signal for transmission on path 123 to cause the switch mode power supply 116 to turn-off (e.g., deactivate). The controller 122 may further transmit signals to the display 124 and/or to the network interface 126 that may be utilized to alert a user of the fault detected. That is, the display 124 may display a visual indication of the type and/or location of a fault based on the signal received from the controller 122. This may allow for action by a user to correct the fault. It should be noted that the steps described above may be performed by hardware, software, or some combination thereof. For example, an algorithm, computer program, or code stored on memory in the controller 122 may be executed by the controller 122 to perform some or all of the steps set forth above.

Additionally, as previously discussed, the automation network 100 may include a network controller 112. The network controller 112 may include a network interface 138 and a controller 140. The network interface 138 may be similar to network interface 126 and the controller 140 may be similar to the controller 122. In one embodiment, the network controller 112 may receive operation information from the IDMs 106, 108, and 110 along communication line 142 from network interfaces 143 (which may include or be separate from network interfaces 119) and display it on display 146, which may be similar to display 122. This information may be transmitted from the controller 132 in each of the IDMs 106, 108, and 110. In one embodiment, this information may be related to sensed conditions in the IDMs 106, 108, and 110 sensed by one or more sensors 144 in each of the IDMs 106, 108, and 110.

On occasion, a problem may occur on the communication network that includes the network controller 112, IDMs 106, 108, and 110, and communication line 142. This problem may cause an interrupt in information, such as operational or diagnostic information relating to IDMs 106, 108, and 110, to be received by the network controller 112. In these situations, the network controller 112 may utilize the network interface 138 to communicate with the IPIM 104 to receive diagnostic and/or operational information relating to, for example, the IDMs 106, 108, and 110. This information may be the same information that is displayed on the display 124 of the IPIM 104.

Figure 2:
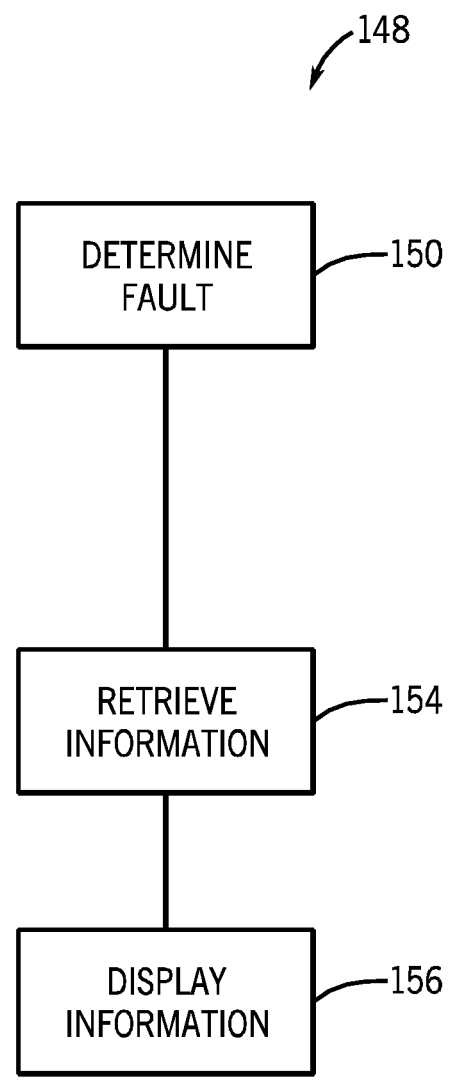
FIG. 2 illustrates a flow chart illustrating the operation of a communication network in the automation network of FIG. 1.

FIG. 2 illustrates a flow chart 148 that illustrates the steps performed by the network controller 112. In one embodiment, these steps may be performed by the network controller 112 via one or more microprocessors in the controller 140, such as one or more "general-purpose" microprocessors, one or more special-purpose microprocessors, FGPAs, and/or ASICs, or some combination thereof. Furthermore, the network controller 112 may execute one or more algorithms, code, or computer programs, which may be stored on a tangible non-transitory machine readable medium, such as volatile memory (e.g., random access memory), and/or non-volatile memory (e.g. read-only memory). This memory may be internal to or directly coupled to the processors or controller 140. In some embodiments, the controller 140 may interact with the display 146 and network interface 138 of the network controller 112 to perform the steps set forth in flow chart 148. In another embodiment, the steps in flow chart 148 may be executed by a controller or processor in the controller 140 as code or a computer program stored on memory of the controller 140.

In step 150, a fault may be determined. This fault may include a failure of one or more of the IDMs 106, 108, or 110 to be able to transmit signals across communication line 142. Thus, this fault may be determined by monitoring communication line 142 via, for example, the network interface 138. When a fault is detected (e.g., that the communication line 142 is not transmitting any data), a signal may be transmitted to the controller 140, and specifically to a controller or processor thereon. However, it should be noted that during this fault, the IPIM 104 is still in communication with network controller 112. Thus, a fault of the IDMs 106, 108, or 110 may also be communicated to the network controller 112 via the IPIM 104.

Thus, in step 154, the controller 140 may retrieve information received from the IPIM 104. This information may include diagnostic information, for example, regarding the operation of the IPIM 104 and the IDMs 106, 108, and 110 received by the network controller 112 along communication line 158. That is, this diagnostic information may be transmitted to the network controller 112 instead of or in addition to being displayed on the display 124, as previously discussed.

In step 154, the information transmitted from the IPIM 104 is received at the network controller 112 by the network interface 138, and is subsequently transmitted to the controller 140. The controller 140 may then utilize this information to generate and display information on display 146 in step 156. This information may be useful in monitoring the status and/or providing diagnostic information for the IPIM 104 and/or the IDMs 106, 108, and 110 even when the communication network has failed. That is, despite a failure in the network connections between the network interface 112 and, for example, IDMs 106, 108, and 110, the operational activity, device status, failure type, or other information relating to the IDMs 106, 108, and 110 may still be received by the network interface 112. This operational information may be, for example, transmitted along hybrid cable 115 from the IDMs 106, 108, and 110 (e.g., from network interfaces 119) to the IPIM 104 (received by network interface 117). This received operational information may be transmitted from the IPIM 104 to the network controller 112 in step 154, outlined above. Thus, diagnostic information may be available to users both locally at the IPIM 104 and/or at the network interface 112, even when a network fault has occurred.

As previously discussed, the use of a display 124 may allow for a user to diagnose and/or rectify problems for the IPIM 104 and/or the IDMs 106, 108, and 110. This may be advantageous as IDMs 106, 108, and 110 may reside on machines in locations where they are not easily visible by an operator or maintenance person and/or are also located in harsh environments where visualization features to aid troubleshooting or status checking are impractical. Thus, having a centrally located display 124 able to display information related to the IPIM 104 and/or the IDMs 106, 108, and 110 may be useful. Moreover, by providing diagnostic visualizations on display 124 for the IPIM 104 and/or the IDMs 106, 108, and 110 instead of, for example, minimal LEDs or other indicators on the IPIM 104 and/or the IDMs 106, 108, and 110, more robust diagnostic information and/or solutions may be presented to a user. Thus, the display 124 may allow a user to identify and resolve faults more rapidly, which may decrease the downtime of the IPIM 104 and/or the IDMs 106, 108, and 110, thus allowing for greater plant efficiencies.

Figure 3:
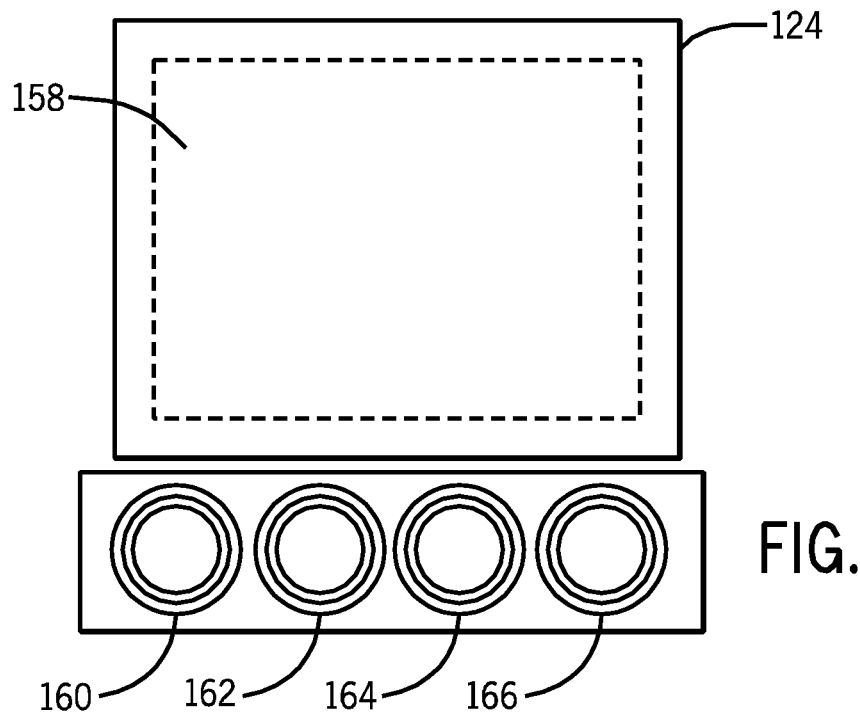
FIG. 3 illustrates a display of FIG. 1, in accordance with an embodiment.

FIG. 3 illustrates one example of the display 124. Display 124 may include a display screen 158 that may be utilized to display information relating to the operation of the IPIM 104, the operation of one or more of the IDMs 106, 108, and/or 110, setup information for the IPIM 104 and/or the IDMs 106, 108, and/or 110 or failures of the IPIM 104 and/or the IDMs 106, 108, and/or 110, among other information useful to a user. In some embodiments, the display screen 158 may be approximately 20 mm high and 30 mm wide, however, other sizes and dimensions are contemplated. The display screen 158 may include, for example, a liquid crystal display, an organic light emitting diode display, or any other conventional display type. In one embodiment, the display screen 158 may be a touch screen display that allows for user input to be received directly on the display screen 158. In another embodiment, the display 124 may include input structures 160, 162, 164, and 166. Input structures 160, 162, 164, and 166 may allow a user to navigate a displayed user interface or application interface. Non-limiting examples of input structures 160, 162, 164, and 166 may include buttons, sliders, switches, control pads, keys, knobs, scroll wheels, keypads, touchpads, and so forth. Additionally, in certain embodiments, one or more input structures 160, 162, 164, and 166 may be provided together with a touch screen display screen 158. Input structures 160, 162, 164, and 166 may facilitate the interaction of a user with the display 124 (which, as previously noted, may be remotely located from the IPIM 104 and located in a smart phone, touchpad, laptop or other electronic device).

The input structures 160, 162, 164, and 166 may also provide further functionality. For example, the display 124 may be deactivated based on a timer. That is, the display 124, or any component thereof (such as a backlight of the display 124) may come on at power up, and stay on for a preset time period, for example, 1 minute, 2 minutes, 5 minutes, or for another period of time. If no input is received during this time period and/or if no changes in the displayed images change during this time period, the display 124 may enter a sleep mode in which nothing is displayed on the display screen 158 (e.g., the display 124 may deactivate its backlight). To revive the display 124, a user may provide inputs to the display 124 via input structures 160, 162, 164, and 166 so that images are again displayed on the display screen 158. In another embodiment, the display 124 may automatically be revived upon the detection of an occurrence, such as, a fault event in the IPIM 104 and/or in one or more of the IDMs 106, 108, and 110.

Figure 4:
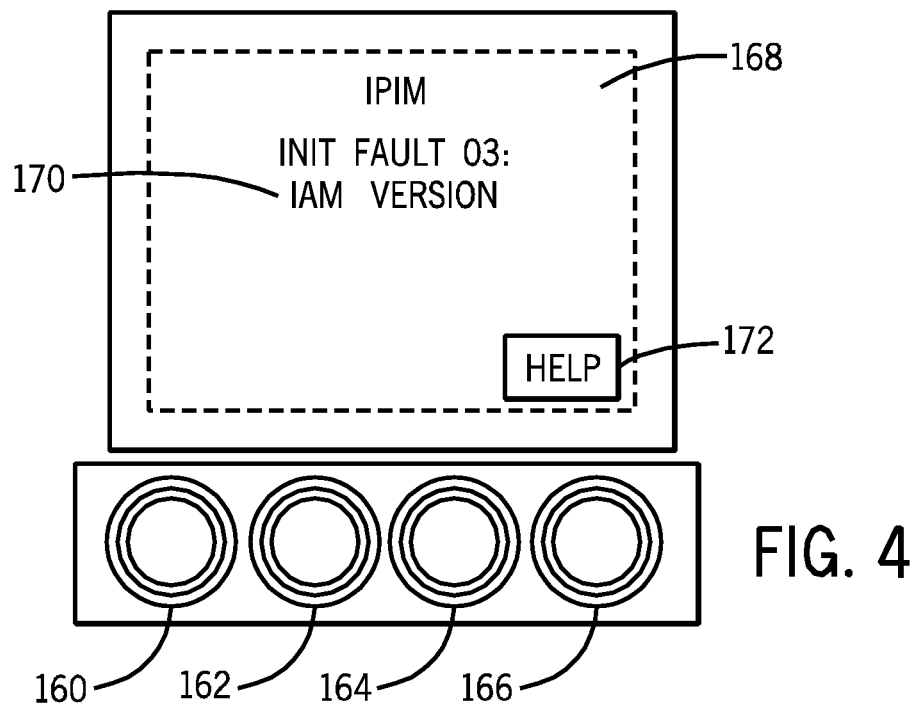
FIG. 4 illustrates a first screen shot of the display of FIG. 3, in accordance with an embodiment.

As illustrated in FIG. 4, the display 124 may display various images generated by the IPIM 104, such as a graphical user interface (GUI) 168 having, for example, text 170 and/or one or more graphical icons such as graphical icon 172. FIG. 4 illustrates an example of an initialization error screen that may occur during the startup of the IPIM 104. As self tests are performed in the IPIM 104 and/or in the IDMs 106, 108, and 110, errors may occur. FIG. 4 shows an example of an initial error screen that may represent a start up fault. As illustrated, the text 170 provides a visual indication of the type of fault that has occurred. Additionally, the graphical icon 172 represents a help button that may allow a user to access additional information relating to the fault represented by the text 170. In some embodiments, the user may access the information related to the graphical icon 172 by interacting with the input structure 166 located directly below the graphical icon 172. Other embodiments may allow for the inclusion of other graphical icons above other input structures (e.g., input structure 164), whereby one such graphical icon might correspond to a plotting feature that allows for a basic oscilloscope function for basic data plotting.

Figure 5:
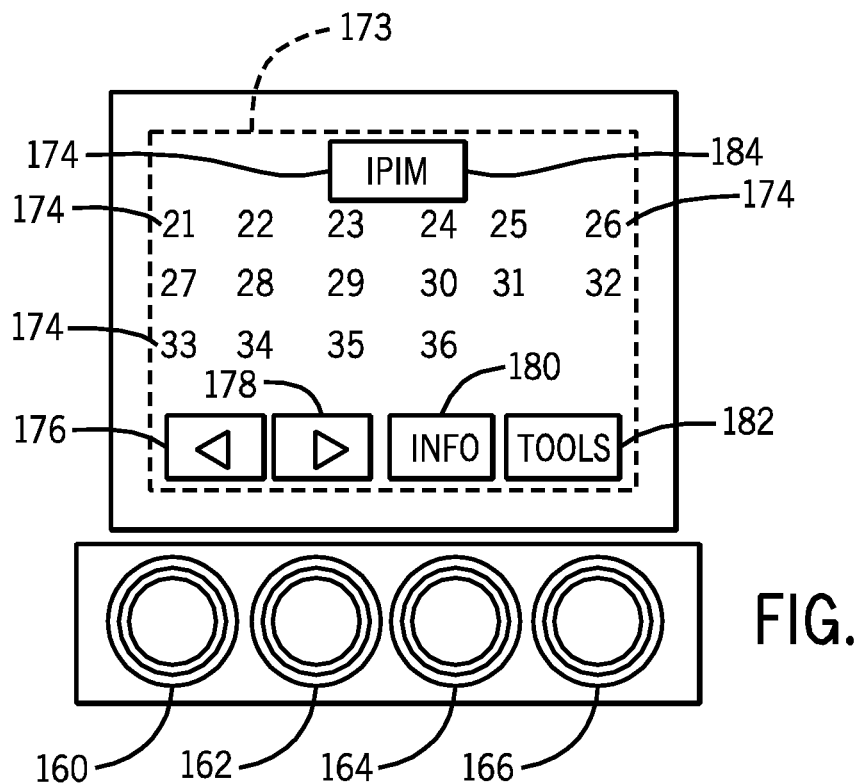
FIG. 5 illustrates a second screen shot of the display of FIG. 3, in accordance with an embodiment.

When no fault is detected during the start up process, a home screen 173 may be displayed on the display screen 158. An example of this home screen 173 is illustrated in FIG. 5. As illustrated, the home screen 173 may include, for example, graphical icons 174 corresponding to various IPIM and IDMs, graphical icons 176 and 178 corresponding to selection arrows, graphical icon 180 corresponding to an information tab, and graphical icon 182 corresponding to a tools icon. In one embodiment, graphical icons 176, 178, 180, and 182 may each correspond to one of input structure 160, 162, 164, or 166, respectively. That is, a user may, for example, manipulate (e.g., depress) input structure 160 to move a selector icon 184 in a particular direction (e.g., to the left). Similarly, a user may, for example, manipulate input structure 162 to move the selector icon 184 in a particular direction (e.g., to the right). Manipulating input structure 164 may, for example, bring up an information screen corresponding to the device associated with the graphical icon 174 currently identified with the selector icon 184 (e.g., encircled by selector icon 184 or otherwise identified as selected), while manipulating input structure 166 may, for example, bring up a tools menu that may include, for example, configuration information for the device associated with the graphical icon 174 currently identified with the selector icon 184 and/or other information about the device associated with the graphical icon 174 currently identified with the selector icon 184.

Figure 6:
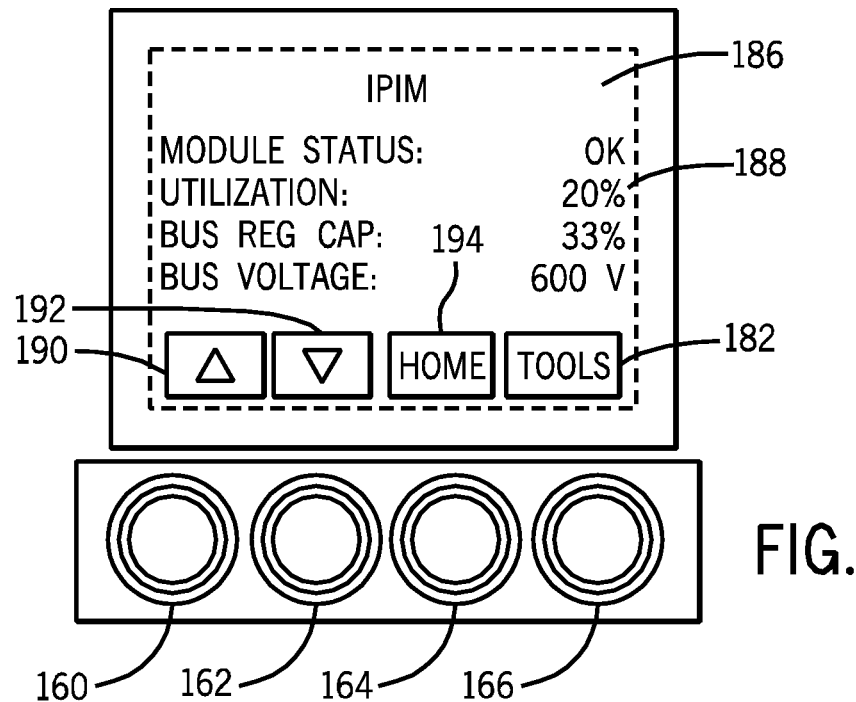
FIG. 6 illustrates a third screen shot of the display of FIG. 3, in accordance with an embodiment.

FIG. 6 illustrates an IPIM information screen 186 that may be displayed when input structure 164 is manipulated to associate the selector icon 184 with the graphical icon 174 identified with the IPIM 104. The IPIM information screen 186 may include text 188 as well as graphical icons 190, 192, 194, and 182 that may each correspond to one of input structure 160, 162, 164, or 166, respectively. Text 188 may include, for example, Module Status information, such as an "OK" indication (which in some embodiments may be colored in a color such as green) to indicate that the IPIM 104 is operating properly, a "Standby" indication (which in some embodiments may be colored in a color such as green and may include another visual indicator such as flashing text) to indicate that the IPIM 104 is operational but no connections have been made yet, a "Faulted" indication (which in some embodiments may be colored in a color such as red and may include another visual indicator such as flashing text) to indicate one or more faults, and/or an "Init Fault" indication (which in some embodiments may be colored in a color such as red) to indicate that the IPIM 104 requires a reboot. Text 188 may also include a Utilization indication that may indicate the percent of maximum root mean squared current being utilized by the IPIM 104, a Bus Reg Cap Percent indication that may indicate the percentage of shunt capacity being utilized by the IPIM 104, a Bus Voltage indication that may indicate the present DC bus voltage in volts, as well as other information such as active fault information (accessible, for example, by manipulation of input structure 160 to scroll through the text 188).

As previously noted, the IPIM information screen 186 includes graphical icons 190, 192, 194, and 182. Graphical icon 190 may represent an up arrow that corresponds to input structure 160. That is, manipulation of input structure 160 allows a user to cycle up through the text 188. Similarly, Graphical icon 192 may represent a down arrow that corresponds to input structure 162, such that manipulation of input structure 162 allows a user to cycle down through the text 188. Graphical icon 194 may represent a home command such that manipulation of input structure 160 allows a user to return to home screen 173. Additionally, in some embodiments, return to home screen 173 may automatically occur based on a timer. That is, the IPIM information screen 186 may stay on for a preset time period, for example, 1 minute, 2 minutes, 3 minutes, or for another period of time. If no input is received during this time period and/or if no changes in the displayed images change during this time period, the display 124 may return to home screen 173. Finally, graphical icon 166 may represent a tools command that may bring up a menu to access additional features.

Returning to FIG. 5, on occasion, a user may wish to view the operational characteristics of an IDM (e.g., IDM 106). Accordingly, a user may manipulate, for example, input structure 162 until the selector icon 184 is associated with the graphical icon 174 representing an IDM named "32". At this time, manipulation of user input 164 will activate an IDM information screen corresponding to IDM "32".

Figure 7:
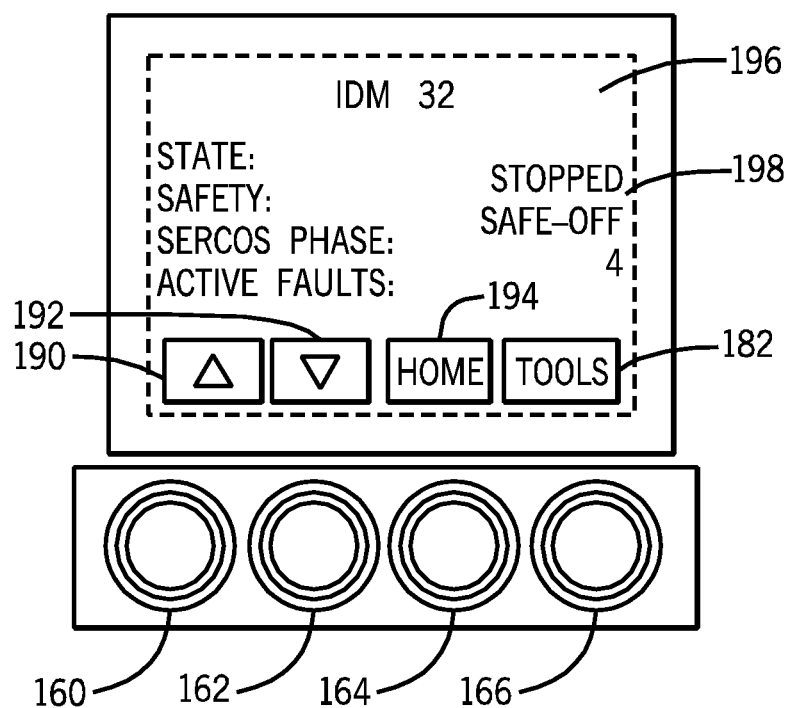
FIG. 7 illustrates a fourth first screen shot of the display of FIG. 3, in accordance with an embodiment.

FIG. 7 illustrates the IDM information screen 196 corresponding to IDM "32". The IDM information screen 196 may include text 198 as well as graphical icons 190, 192, 194, and 182 that may each correspond to one of input structure 160, 162, 164, or 166, respectively. Text 198 may include, for example, State information, including, for example, the operational or communication state of the IPM (e.g., IPM 106) named "32". Text 198 may also include a Safety indication corresponding to whether the IDM "32" is safe (e.g., in a safe-off condition), for example, to be accessed by a user, a serial real-time communication system (SERCOS) phase indication corresponding to the current SERCOS phase of the IDM "32", an Active Fault indication that may correspond to faults in the IDM "32", as well as other information accessible, for example, by manipulation of input structure 160 to scroll through the text 198).

Similar to the IPIM information screen 186, the IDM information screen 196 includes graphical icons 190, 192, 194, and 182. Graphical icon 190 may represent an up arrow that corresponds to input structure 160. That is, manipulation of input structure 160 allows a user to cycle up through the text 188. Similarly, Graphical icon 192 may represent a down arrow that corresponds to input structure 162, such that manipulation of input structure 162 allows a user to cycle down through the text 188. Graphical icon 194 may represent a home command such that manipulation of input structure 160 allows a user to return to home screen 173. Additionally, in some embodiments, return to home screen 173 may automatically occur based on a timer. That is, the IDM information screen 186 may stay on for a preset time period, for example, 1 minute, 2 minutes, 3 minutes, or for another period of time. If no input is received during this time period and/or if no changes in the displayed images change during this time period, the display 124 may return to home screen 173. Finally, graphical icon 166 may represent a tools command that may bring up a menu to access additional features.

It is appreciated that in addition to screens 173, 186, and 196, additional screens corresponding to, for example, network address configuration screens for the IPIM 104 and/or the IDMs 106, 108, and 110 may be generated and displayed on the display 124. As such, the display 124, as integrated into the IPIM 104 may allow for visual diagnostics of the IPIM 104 and/or the IDMs 106, 108, and 110 in an easily visible manner and in an easily accessible location. Furthermore, the display 124 may be highly interactive and may be powered by a power supply 118 separate from the power supply 116 utilized to transmit power to the IDMs 106, 108, and 110, such that diagnostics may be available to a user even when a short occurs.

While only certain features of the invention have been illustrated and described herein, many modifications and changes will occur to those skilled in the art. It is, therefore, to be understood that the appended claims are intended to cover all such modifications and changes as fall within the spirit and scope of this disclosure.

The invention claimed is:

1. A motor drive system, comprising:
an integrated power interface module (IPIM) comprising circuitry configured to communicate with at least one networked integrated motor drive;
an integrated motor drive (IDM) coupled to the IPIM and configured to communicate with the IPIM during operation; and
an automation controller coupled to and configured to communicate with both the IPIM and the IDM during operation;
wherein, in operation, the IPIM receives operational data from the IDM and communicates operational data to the automation controller, and wherein the IDM is also configured to communicate operational data to the automation controller, and wherein in the event of inoperability of the IDM, operational data is still communicated from the IPIM to the automation controller.

2. The system of claim 1, wherein the IPIM and the automation controller communicate with the IDM over separate networks.

3. The system of claim 1, wherein the operational data communicated from the IPIM to the automation controller relates to operation of the IPIM.

4. The system of claim 1, wherein the operational data communicated from the IPIM to the automation controller relates to operation of the IDM.

5. The system of claim 1, wherein the IPIM provides power to the IDM, and comprises a power supply for deriving power for operation of control and/or communication circuitry within the IPIM.

6. The system of claim 1, wherein the IPIM comprises a display allowing interfacing with the IPIM in operation.

7. The system of claim 1, wherein the IPIM is configured to interface with a separate display device wirelessly coupled to the IPIM.

8. An integrated power interface module (IPIM), comprising:
control and/or communication circuitry for providing power and data to at least one networked integrated motor drive (IDM), the circuitry receiving operational data from the IDM during operation;

an integrated power supply configured to provide power for operation of the control and/or communication circuitry; and wireless communication circuitry configured to communicate operational data with a separate interface device during operation.

9. The IPIM of claim 8, wherein the wireless communication circuitry is configured to communicate with the separate interface device via a Zigbee or Bluetooth communication protocol.

10. The IPIM of claim 8, wherein the operational data communicated from the IPIM to the automation controller relates to operation of the IPIM.

11. The system of claim 8, wherein the operational data communicated from the IPIM to the automation controller relates to operation of the IDM.

12. The system of claim 8, wherein the separate interface device comprises a handheld device.

13. The system of claim 12, wherein the separate interface device comprises a smart phone.

14. A motor drive system, comprising:

an integrated power interface module (IPIM) comprising IPIM control circuitry and power supply circuitry configured to convert incoming power to power needed for control circuitry, the IPIM being configured to provide power to other networked components; and an integrated motor drive (IDM) coupled to the IPIM and configured to receive power from the IPIM, the IDM comprising IDM control circuitry and power supply circuitry configured to convert power from the IPIM to power needed for the IDM control circuitry.

15. The system of claim 14, wherein the IPIM is configured to communicate operational data to the IDM along with power.

16. The system of claim 14, wherein both the IPIM and the IDM are configured to communicate operational data to a networked automation controller that includes data relating to operation of the IPIM and data related to operation of the IDM.

17. A method for operation of a motor drive system, comprising:

communicating operational data from an integrated drive motor (IDM) to an integrated power interface module (IPIM) that provides power and data to the IDM;

communicating operational data from both the IPIM and the IDM to a networked automation controller;

in the event of inoperability of the IDM, continuing to communicate operational data from the IPIM to the automation controller.

18. The method of claim 17, comprising communicating the operational data from the IPIM and the IDM to the automation controller over different networks.

19. The method of claim 17, wherein the operational data communicated from the IPIM to the automation controller relates to operation of the IPIM.

20. The system of claim 17, wherein the operational data communicated from the IPIM to the automation controller relates to operation of the IDM.

\* \* \* \* \*